July 23, 1940. O. FISCHER 2,209,156
PHOTOGRAPHIC CAMERA
Filed July 8, 1939
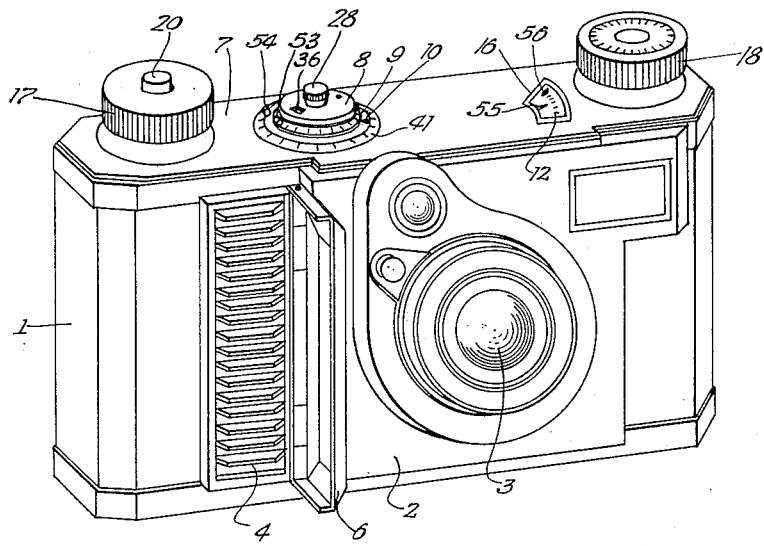
Inventor:
Oskar Fischer
By: B. Singer & F. Stern
Attys.

Patented July 23, 1940

2,209,156

UNITED STATES PATENT OFFICE 2,209,156

PHOTOGRAPHIC CAMERA

Oskar Fischer, Dresden, Germany, assignor to Zeiss Ikon Aktiengesellschaft, Dresden, Germany Application July 8, 1939, Serial No. 283,333
In Germany April 16, 1938

8 Claims. (Cl. 95—10)

The invention relates to improvements in photographic cameras and particularly is directed to photographic cameras whose exposure determining elements, as the shutter and the objective diaphragm, are coupled with a photoelectric exposure meter.

It is an object of the invention to provide the camera with a photoelectric exposure meter which when the latter is manually adjusted to a predetermined position causes also an adjustment of the diaphragm aperture to a value which corresponds to the speed to which the shutter of the camera has been set so that upon a release of the shutter a correctly exposed negative is produced.

Another object of the invention is to provide the camera with a single manually operable member adapted to adjust the camera selectively to any one of a number of diaphragm aperture-shutter speed combinations, any one of which would—provided the exposure meter was previously correctly adjusted—result in a correctly exposed negative, without changing the adjustment of the exposure meter.

It is also an object of the invention to provide the exposure meter adjusting member which also adjusts at the same time the diaphragm of the camera with means for adjusting the exposure meter to different film speeds.

Another object of the invention is to operatively connect the shutter speed adjusting means of the camera by means of a differential planetary gearing with the diaphragm adjusting means of the camera objective and to operatively connect an adjustable resistance in the circuit of the exposure meter in such manner with said differential gearing that upon an adjustment of the resistance the diaphragm adjusting means only is operated, but not the shutter adjusting means of the camera.

With these and other objects in view, the invention consists in the combination of parts and arrangements thereof as described by way of example in the following description, with reference to the accompanying drawing.

The drawing illustrates one embodiment of the present invention:

Fig. 1 is a perspective view of a photographic camera whose shutter speed adjustment and lens diaphragm setting means are coupled with a photoelectric exposure meter.

Fig. 2 illustrates the photoelectric exposure meter and its operative connection with the camera partly in section and partly diagrammatically, and Fig. 3 is a top plan view of the combined setting device for the camera and the photoelectric exposure meter.

In the drawing, the Fig. 1 illustrates by way of example a miniature roll film camera comprising a camera casing 1 provided on its front wall 2 with a photographic objective 3 and a prism window 4 which is mounted directly in front of the photoelectric cell 5 (Fig. 2) of the exposure meter. A cover 6 hinged to the front wall 2 is provided for closing the window 4 when the exposure meter is not used.

The narrow top wall 7 of the camera casing 1 has mounted thereon a group of three concentrically arranged members 8, 9 and 10 adapted to adjust the exposure determining device of the camera in accordance with the indication of a measuring instrument 12 arranged in the circuit 13, 14, 15 (Fig. 2) of the exposure meter. The measuring instrument 12 can be read through a window 16 in the top wall 7 of the camera casing 1. The customary film winding knob and film rewinding knob of the camera are designated with 17 and 18 respectively. The film winding knob 17 in this type of a camera serves also in well known manner as a shutter tensioning member. The shutter release button 20 is mounted axially within the film winding knob 17. In the diagrammatic illustration of the photographic camera objective 3, the shutter 45 and its operative connections with the exposure meter in Fig. 2, the shutter release button 20 is shown as a lever with a finger piece.

Referring now more particularly to Fig. 2 which for the sake of clearness illustrates the various parts of the exposure meter in an enlarged scale, it will be noted that an annular resistance 22, which is connected in the circuit 13, 14, 15 containing the photoelectric cell 5 and the measuring instrument 12, is fixedly mounted on the bottom wall 23 of a chamber 24 within the camera casing just below the top wall 7 thereof. A slidable contact member 25 engages the resistance 22 and is attached to a plate 26 on the lower end of a shaft 27 extending upwardly and having on its upper end a knob 28 adapted to rotate the shaft 27 and therewith the slidable contact member 25. The knob 28 is also adapted to move the shaft 27 axially against the tension of a spring 30 for a purpose to be described presently.

The spring 30 surrounds the shaft 27 between a stationary bearing bracket 32 and the plate 26 which carries the contact member 25. On the shaft 27 is attached just below the actuating knob 28 the circular plate 8 provided with a downwardly extending coupling pin 33 projecting into one of a series of apertures 34 provided in the next lower concentric member 9. The member 9 by means of a sleeve 35 integral therewith is rotatably mounted on the shaft 27. The members 8 and 9 form a device for adjusting the exposure meter for different speeds of the photographic emulsion on the film used in the camera. Each of the series of apertures 34 corresponds to a predetermined film speed. In order to adjust the exposure meter for a predetermined film speed the shaft 27 is moved axially upwardly by pulling on the knob 28 until the coupling pin 33 is lifted sufficiently to disengage the concentric member 9, then the knob 28 is rotated until the coupling pin 33 is opposite the aperture corresponding to the desired film speed, whereupon the knob 28 is released so as to permit the spring 30 to draw the shaft 27 downwardly until the coupling pin 33 enters the selected aperture in the concentric member 9. In the example shown in Fig. 3 the exposure meter has been adjusted for a film speed of 18° Scheiner, the numeral "18" of a series of numbers applied to the top face of the concentric member 9 appearing in a window 36 of the plate 8.

The concentric member 9 is provided on its outer circumference with a beveled surface to which a diaphragm aperture scale 38 (Fig. 3) is applied. The sleeve 35 of the concentric member 9 in turn supports rotatably the concentric member 10 provided with an index 40. Upon rotation of the member 10 the index 40 not only moves along the diaphragm scale 38 on the member 9, but at the same time moves along a shutter speed scale 41 which is applied to a beveled annular surface on the top wall 7 of the camera casing and which concentrically surrounds the members 8, 9 and 10.

The outer circumference of the member 10 is provided with gear teeth 42 for operating a train of gears which is adapted to adjust the timing mechanism of the shutter of the camera. In Fig. 2 the train of gears is diagrammatically illustrated by a single gear 43 which meshes with gear teeth on the shutter speed adjusting ring 44. The shutter is indicated at 45. The member 10 is attached to or integrally formed with a bevel gear 46 meshing with a planetary gear 47 rotatably mounted on a gear 48, which is rotatably mounted on the shaft 27 between the lower end of the sleeve 35 and the bearing bracket 32. The lower end of the sleeve 35 has attached thereto a bevel gear 50 also meshing with the planetary gear 47. The gear 48 which forms the carrier for the planetary gear 47 is connected by a train of gears with the diaphragm adjusting mechanism of the camera. In Fig. 2 this train of gears is diagrammatically illustrated by a single gear 50ª which meshes with gear teeth on the diaphragm adjusting ring 52.

In connection with Fig. 2 it is desired to point out, that the right hand portion illustrating the objective is to be considered as diagrammatic. This simplified illustration has been selected to show the principle of the invention in readily understandable form. It is obvious from Fig. 1, that the gear trains 43 and 50ª respectively consist each of a number of gears so designed to transmit a proper movement from the gears 42 and 48 to the shutter speed adjusting ring 44 and the diaphragm adjusting ring 52 respectively, which latter are rotatable about the axis of the objective which is at a right angle to the axis of the exposure meter shaft 27.

The concentric members 9 and 10 are provided each with an outwardly projecting pin 53 and 54 respectively, which permit a convenient rotative adjustment of the respective member.

After the exposure meter has been adjusted for a predetermined film speed, in a manner already described, the adjustment of the shutter speed adjusting ring and the diaphragm aperture for making a correct exposure takes place as follows:

With the cover 6 open and the camera held so that the light reflected from the scene to be photographed passes through the prism window 4 to energize the photoelectric cell 5, the concentric member 9 provided with the diaphragm scale 38 is rotated until the pointer 55 of the measuring instrument 12 comes to rest opposite a mark 56. It is believed to be obvious that during the rotative adjustment of the member 9 owing to its coupling with the member 8, the shaft 27 will likewise be rotated so as to move the contact member 25 along the resistance 22 thereby varying the latter and the total resistance in the circuit of the exposure meter.

A rotative adjustment of the concentric member 9 as described causes also a rotation of the bevel gear 50 which rotates the planetary gear 47, causing the latter to roll along the circumference of the other bevel gear 46 which during this operation of the differential planetary gearing 50, 47, 46 remains stationary. The result is that the gear 48, on which the planetary gear 47 is mounted, is rotated to operate the train of gears 50ª and thereby adjusts the diaphragm aperture to the value indicating by the index 40 on the member 10.

The diaphragm aperture-shutter speed combination indicated by the index 40 after the above described adjustment of the diaphragm scale member 9 indicates the values to which the diaphragm and the shutter of the camera have been adjusted to obtain a correctly exposed negative when the shutter 45 is actuated by depressing the release member 20. As illustrated in Fig. 3 the diaphragm aperture has been adjusted to f:5.6 and the shutter to a speed of 1/50 of a second.

Now it may be that this diaphgram aperture-shutter speed combination is not suitable for the particular scene to be photographed. The reasons may be manifold and merely for the purpose of explaining the present invention and its employment more specifically, it be assumed that it is desired to take a picture of fast moving objects, as a horse race, automobile race, tennis players in action, etc.

Obviously a speed of 1/50 of a second is too slow, but a glance at the concentrically arranged diaphragm aperture and shutter speed scales indicates that at a diaphragm aperture of f:2.8 a shutter speed of 1/200 of a second may be employed. In order to adjust the camera to this more suitable diaphragm aperture-shutter speed combination it is necessary only to adjust a single element, namely the member 10 until the index 40 on the latter appears between the two numbers 2.8 and 200. Upon rotative adjustment of the member 10 its gear teeth 42 effect an operation of the gear train 43 which varies the adjustment of the speed of the shutter 44 to the value indicated by the index 40 on the scale 41. At the same time, however, the gear 46 rotates the planetary gear 47, which now rolls along the stationary gear 50 and thereby rotates the gear train 50 to adjust the diaphragm aperture to the value indicated by the index 40 on the scale 38. During this adjustment of the member 10 the shaft 27 and therewith the slidable contact member 25 remain stationary and no adjustment in the electric circuit of the exposure meter takes place. It is thus apparent that upon a single adjustment of the current in the circuit of the exposure meter to a predetermined value, the diaphragm aperture scale and shutter speed scale are brought into such a relation to each other that for the prevailing light conditions a number of diaphragm aperture-shutter speed combinations are indicated, all of which will give a correctly exposed negative. The camera may be adjusted to any one of the diaphragm aperture-shutter speed combinations indicated by merely adjusting a single member which simultaneously varies the diaphragm aperture and the shutter speed.

Sometimes the photographer has a general idea at what a shutter speed he desires to photograph a scene, object or the like. In such a case he may adjust the member 10 prior to energizing the photoelectric cell 5 to the light coming from the scene to a position in which the index 40 is opposite the desired shutter speed. Then the exposure meter is adjusted by rotatably adjusting the member 9 until the pointer 55 of the measuring instrument is opposite the fixed mark 56, which at the same time causes an adjustment of the diaphragm aperture to a value indicated by the index 40 on the scale 38. If it should appear to the photographer that the diaphragm aperture has been adjusted to a value which for any reason whatsoever is not suitable for the scene to be photographed, he may adjust the camera to any other of the diaphragm aperture-shutter speed combination indicated by the two concentrically arranged scales 38 and 41 by merely adjusting the member 10 until the index 40 indicates that the camera has been set to the desired exposure value.

What I claim is:

1. In a photographic camera, the combination of a photoelectric exposure meter, a lens diaphragm adjusting means, and a shutter speed adjusting means, said photoelectric exposure meter including a manually operable member for adjusting the electric current in said exposure meter to a predetermined value, a planetary gearing operatively connecting said manually operable member with said diaphragm adjusting means for operating the latter whenever said exposure meter is adjusted, said planetary gearing including a sun gear fixedly connected with said manually operable member, and a planetary gear rotatably mounted on a member freely rotatable about the axis of said sun gear, said member being drivingly connected with said diaphragm adjusting means, and a second manually operable member adapted to simultaneously operate said shutter speed adjusting means and said diaphragm adjusting means without varying thereby the adjustment of said exposure meter, said second manually operable member being provided with gear teeth meshing with said planetary gear and being also drivingly connected with said shutter speed adjusting means.

2. In a photographic camera, the combination of a photoelectric exposure meter, a lens diaphragm adjusting means, and a shutter speed adjusting means, said photoelectric exposure meter including a manually operable member for adjusting the electric current in said exposure meter to a predetermined value, a planetary gearing operatively connecting said manually operable member with said diaphragm adjusting means for operating the latter whenever said exposure meter is adjusted, said planetary gearing including a sun gear fixedly connected with said manually operable member, and a planetary gear rotatably mounted on a member freely rotatable about the axis of said sun gear, said member being drivingly connected with said diaphragm adjusting means, and a second manually operable member adapted to simultaneously operate said shutter speed adjusting means and said diaphragm adjusting means without varying thereby the adjustment of said exposure meter, said second manually operable member being rotatable about the axis of said sun gear and being provided with gear teeth forming a second sun gear which meshes with said planetary gear, said second manually operable member being also provided with means drivingly connecting the same with said shutter speed adjusting means.

3. In a photographic camera, the combination of a photoelectric exposure meter, a lens diaphragm adjusting means, and a shutter speed adjusting means, said photoelectric exposure meter including a fixedly mounted electrical resistance engaged by a slidable contact member for varying said resistance, a manually rotatable shaft on which said contact member is secured, a planetary gearing operatively connecting said shaft with said diaphragm adjusting means for adjusting the latter whenever said shaft is rotated during the adjustment of the exposure meter, said planetary gearing including a sun gear fixedly connected with said manually rotatable shaft between the ends thereof and a planetary gear rotatably mounted about its own axis on a member rotatably supported by said shaft, said member being drivingly connected with said diaphragm adjusting means, and a manually operable member adapted to simultanously operate said shutter speed adjusting means and said diaphragm adjusting means without varying thereby the adjustment of said exposure meter, said manually operable member being provided with gear teeth meshing with said planetary gear and being also drivingly connected with said shutter speed adjusting means.

4. In a photographic camera, the combination of a photoelectric exposure meter, a lens diaphragm adjusting means, and a shutter speed adjusting means, said photoelectric exposure meter including a fixedly mounted electrical resistance engaged by a slidable contact member for varying said resistance, a manually rotatable shaft on which said contact member is secured, a planetary gearing operatively connecting said shaft with said diaphragm adjusting means for adjusting the latter whenever said shaft is rotated during the adjustment of the exposure meter, said planetary gearing including a sun gear fixedly connected with said manually rotatable shaft between the ends thereof and a planetary gear rotatably mounted about its own axis on a member rotatably supported by said shaft, said member being drivingly connected with said diaphragm adjusting means, and a manually operable member adapted to simultaneously operate said shutter speed adjusting means and said diaphragm adjusting means without varying thereby the adjustment of said exposure meter, said last named manually operable member being rotatable about the axis of said shaft and being provided with gear teeth forming a second sun gear which meshes with said planetary gear, said last named manually operable member being also provided with means drivingly connecting the same with said shutter speed adjusting means.

5. In a photographic camera, the combination of a photoelectric exposure meter, a lens diaphragm adjusting means, and a shutter speed adjusting means, said photoelectric exposure meter including a manually operable member for adjusting the electric current in said exposure meter to a predetermined value, a planetary gearing operatively connecting said manually operable member with said diaphragm adjusting means for operating the latter whenever said exposure meter is adjusted, said planetary gearing including a sun gear fixedly connected with said manually operable member, and a planetary gear rotatably mounted on a member freely rotatable about the axis of said sun gear, said member being drivingly connected with said diaphragm adjusting means, and a second manually operable member adapted to simultaneously operate said shutter speed adjusting means and said diaphragm adjusting means without varying thereby the adjustment of said exposure meter, said second manually operable member being provided with gear teeth meshing with said planetary gear and being also drivingly connected with said shutter speed adjusting means, and means connected with said first mentioned manually operable member for adjusting the exposure meter to different film speeds.

6. In a photographic camera, the combination of a photoelectric exposure meter, a lens diaphragm adjusting means, and a shutter speed adjusting means, said photoelectric exposure meter including a fixedly mounted electrical resistance engaged by a slidable contact member for varying said resistance, a manually rotatable shaft on which said contact member is secured, a planetary gearing operatively connecting said shaft with said diaphragm adjusting means for adjusting the latter whenever said shaft is rotated during the adjustment of the exposure meter, said planetary gearing including a sun gear normally connected with said manually rotatable shaft between the ends thereof so as to rotate with said shaft, selectively adjustable coupling means between said sun gear and said shaft for varying the relative angular position between the said sun gear and said contact member, whereby an adjustment of said exposure meter for different film speeds is accomplished, and a planetary gear rotatably mounted about its own axis on a member rotatably supported by said shaft, said member being drivingly connected with said diaphragm adjusting means, and a manually operable member adapted to simultaneously operate said shutter speed adjusting means and said diaphragm adjusting means without varying thereby the adjustment of said exposure meter, said manually operable member being provided with gear teeth meshing with said planetary gear and being also drivingly connected with said shutter speed adjusting means.

7. In a photographic camera, the combination of a photoelectric exposure meter, a lens diaphragm adjusting means, and a shutter speed adjusting means, said photoelectric exposure meter including a fixedly mounted electrical resistance engaged by a slidable contact member for varying said resistance, a manually rotatable shaft on which said contact member is secured, a planetary gearing operatively connecting said shaft with said diaphragm adjusting means for adjusting the latter whenever said shaft is rotated during the adjustment of the exposure meter, said planetary gearing including a sun gear normally connected with said manually rotatable shaft between the ends thereof so as to rotate with said shaft, selectively adjustable coupling means between said sun gear and said shaft for varying the relative angular position between the said sun gear and said contact member, whereby an adjustment of said exposure meter for different film speeds is accomplished, cooperative indicating means on said shaft and sun gear respectively for visually indicating the film speed for which said exposure meter has been adjusted, a planetary gear rotatably mounted about its own axis on a member rotatably supported by said shaft, said member being drivingly connected with said diaphragm adjusting means, and a manually operable member adapted to simultaneously operate said shutter speed adjusting means and said diaphragm adjusting means without varying thereby the adjustment of said exposure meter, said manually operable member being provided with gear teeth meshing with said planetary gear and being also drivingly connected with said shutter speed adjusting means.

8. In a photographic camera, the combination of a photoelectric exposure meter, a lens diaphragm adjusting means, and a shutter speed adjusting means, said photoelectric exposure meter including a fixedly mounted electrical resistance engaged by a slidable contact member for varying said resistance, a manually rotatable and axially movable shaft on which said contact member is secured, a planetary gearing operatively connecting said shaft with said diaphragm adjusting means for adjusting the latter whenever said shaft is rotated during the adjustment of the exposure meter, said planetary gearing including a sun gear mounted on said manually rotatable and axially movable shaft between the ends thereof, a coupling member fixedly attached to said shaft, spring means for normally urging said shaft axially in a direction in which said coupling member drivingly engages said sun gear to rotate the latter when said shaft is rotated, said coupling member, upon an axial movement of said shaft against the action of said spring being adapted to be rotatably adjusted with respect to said sun gear to engage selectively different points of the same, each of which denotes a different film speed, and a planetary gear rotatably mounted about its own axis on a member rotatably supported by said shaft, said member being drivingly connected with said diaphragm adjusting means, and a manually operable member adapted to simultaneously operate said shutter speed adjusting means and said diaphragm adjusting means without varying thereby the adjustment of said exposure meter, said manually operable member being provided with gear teeth meshing with said planetary gear and being also drivingly connected with said shutter speed adjusting means.

OSKAR FISCHER.